United States Patent [19]

Vogl

[11] Patent Number: 4,657,741
[45] Date of Patent: Apr. 14, 1987

[54] REACTOR CONSTRUCTION

[75] Inventor: Rudolf Vogl, Deggendorf, Fed. Rep. of Germany

[73] Assignee: Deggendorfer Werft und Eisenbau GmbH, Fed. Rep. of Germany

[21] Appl. No.: 711,410

[22] Filed: Mar. 13, 1985

[30] Foreign Application Priority Data

Mar. 13, 1984 [DE] Fed. Rep. of Germany ....... 3409159

[51] Int. Cl.$^4$ .......................... B01J 8/06; F28D 21/00
[52] U.S. Cl. ..................................... 422/202; 165/159; 422/148; 422/197; 422/205
[58] Field of Search ........................ 165/159, 160, 161; 422/148, 197, 201, 202, 205, 208

[56] References Cited

U.S. PATENT DOCUMENTS

| 2,198,555 | 4/1940 | Wilson et al. | 422/197 |
|---|---|---|---|
| 2,240,347 | 4/1941 | Page, Jr. et al. | 422/197 |
| 2,352,704 | 7/1944 | Garner | 165/161 |
| 3,434,807 | 3/1969 | Ibing et al. | 422/197 |
| 3,566,961 | 3/1971 | Lorenz et al. | 422/202 |
| 3,762,465 | 10/1973 | Gutlhuber | 165/159 |
| 3,850,232 | 11/1974 | Wanka et al. | 422/197 |
| 3,871,445 | 3/1975 | Wanka et al. | 165/161 |
| 3,901,659 | 8/1975 | Joklik et al. | 422/205 |
| 4,256,783 | 3/1981 | Takada et al. | 165/161 |

FOREIGN PATENT DOCUMENTS 2903582  8/1980  Fed. Rep. of Germany ...... 422/197

Primary Examiner—Michael S. Marcus
Attorney, Agent, or Firm—McGlew and Tuttle

[57] ABSTRACT

A reactor for carrying out exothermic and endothermic catalytic reactions includes a contact tube bundle and radial admission and removal of a heat transfer medium via an annular duct for each, and a circulation through an external heat exchanger. Two or more circulating pumps are connected to the annular ducts and are distributed over the circumference. The heat exchanger can be arranged in shunt to the main circulation and be connected with individual sections of at least one annular duct via setting elements.

14 Claims, 3 Drawing Figures

REACTOR CONSTRUCTION

FIELD AND BACKGROUND OF THE INVENTION

This invention relates in general to reactors and in particular to a new and useful reactor which includes a reactor jacket or housing having vertically spaced annular ducts thereon which are connected to a heat exchanger circulating line and which provide means for controlled circulation of a heat exchange medium to a central area of the reactor having a tube bundle.

The invention relates to a reactor for carrying out exothermic and endothermic catalytic reactions, having a contact tube bundle surrounded by a reactor jacket and with radial admission and discharge of a heat transfer medium via an annular duct for each by means of a pump in circulation over an external heat exchanger.

A similar reactor is known, for example, from German disclosure No. 1,601,162. The respective annular ducts permit conducting the heat transfer medium through a plurality of openings distributed over the circumference to the interior of the reactor and to discharge it therefrom. Yet, and despite the additional use of distributor plates for instance according to German disclosure No. 1,675,501, in particular in the case of very large reactors with correspondingly numerous tubes, and also when carrying out reactions with a very strong heat tone, certain difficulties result with respect to a uniform heat removal and supply, as the individual openings occur at very different distances from the point of supply and removal at the respective annular duct. To make the annular ducts correspondingly large would mean a high structural cost and would sometimes also present a problem of space. On the other hand, the use of small aperture cross-sections would unreasonably increase the energy requirement for circulating the heat transfer medium. Besides, electric drive motors of for instance 400 kW, as they enter into consideration for large reactors with strong heat tone, being slow-running, are available only in high-voltage design at correspondingly high cost and with a correspondingly high weight and space requirement.

SUMMARY OF THE INVENTION

The invention reduces the structural expense with respect to installation, costs and space in relatively large reactors and in particular when carrying out therein reactions of strong heat tone while obtaining a good yield of uniformly good reaction products.

In accordance with the invention a reactor for carrying out exothermic and endothermic catalytic reactions comprises a reactor housing having a contact tube bundle therein with an annular duct and at least two axially spaced locations around the housing which have circumferentially spaced admission and discharge passages for heat transfer medium to the bundle. An external heat exchanger is connected to each of the annular ducts and a plurality of pumps are connected to each of the annular ducts at junctions distributed over the circumference of the ducts.

The several pumps for the circulation of the heat transfer medium ensures a largely uniform entrance and exit of the heat transfer medium even when using relatively narrow annular ducts. By the shortening of the maximum transport paths the power requirement decreases more than proportionally. The quantities conveyed by the individual pumps can be adjusted (set) and changed individually as needed. Furthermore, pump driving motors of for example only 200 kW are still available in normal voltage models. Accordingly, at least the installation cost is reduced.

A reactor of a similar type as set forth in German disclosure No. 2,201,528 includes several pumps which are, in part, in direct communication with an associated heat exchanger and are connected to sections of the reactor lying essentially one behind the other axially but also in part overlapping, via a corresponding number of annular ducts. This, however, is intended to achieve that one can influence the temperature characteristic along the contact tubes in a desired manner, and in no case do the respective pumps have annular ducts in common on the entrance as well as on the exit side.

Accordingly it is an object of the invention to provide an improved reactor which includes a housing for a tube bundle and heat transfer medium circulating system which includes annular ducts around the housing which connect to a heat exchanger circulating system and which provide means for directing the heat exchanged media selectively over annular and semi-annular areas directly into the tube bundle and through a return.

A further object of the invention is to provide a reactor which is simple in design rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference it made to the accompanying drawings and descriptive matter in which a preferred embodiment of the invention is illustrated.

DESCRIPTION OF THE PREFERRED EMBODIMENT

Figure 2:
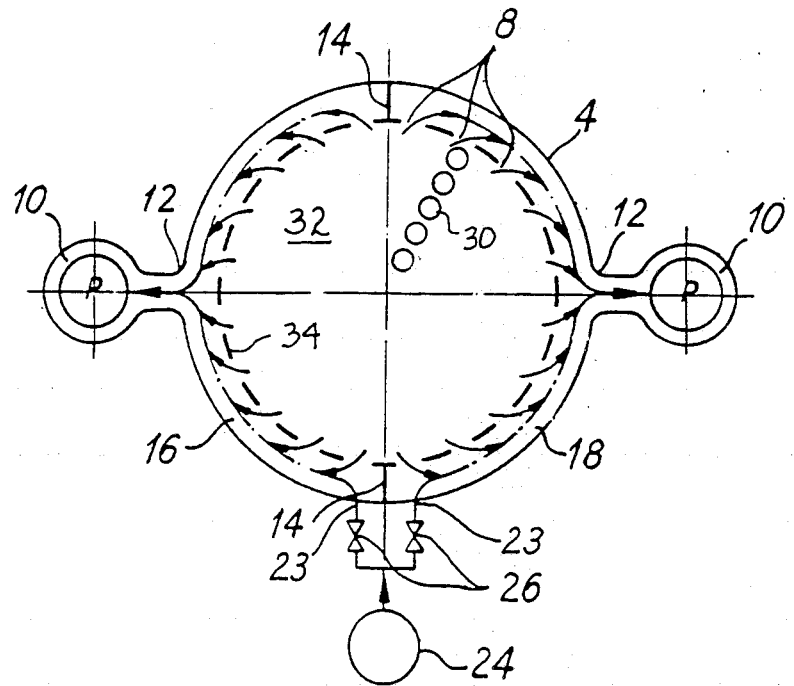
FIG. 2 is a horizontal sectional view of the reactor shown in FIG. 1.
Figure 3:
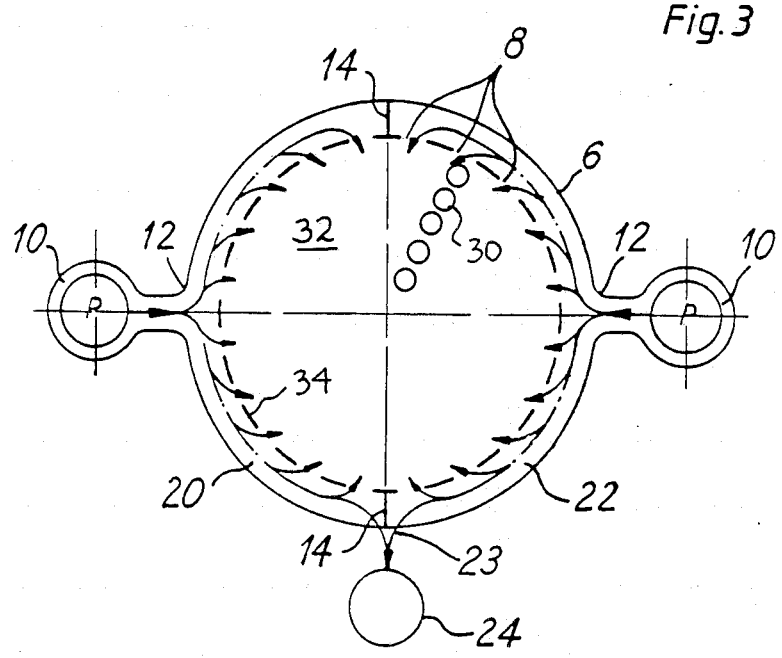
FIG. 3 is a view similar to FIG. 2 at a different level.

Referring to the drawings in particular the invention embodied therein comprises a reactor which includes a cylindrical housing or jacket 2 having a plurality of annular ducts which in the embodiment shown comprises two vertically spaced ducts 4 and 6 which extend around the housing. In accordance with the invention a tube bundle 30 is arranged in a central area 32 of the reactor housing. At least two diametrically opposite pump junctions 12,12 are connected to each of the annular ducts 4 and 6 at diametrically opposite locations. A pump 10 is associated with each junction 12. The annular ducts 4 and 6 have closing walls 14,14 at spaced locations from the junctions 12,12. The ducts 4 and 6 have interior circumferential walls 34 with circumferentially spaced openings 8 which connect into the space 32. The heat exchanger 24 has a connecting circulating line 24a for a heatexchange media which is connected from the heat exchanger 24 into at least two of the ducts 4 and 6 and as shown in FIGS. 2 and 3 the connection is on opposite sides of the closing wall 14 which is located between the junctions 12,12. Control means in the form of setting devices or valves 26 are associated with the heat exchanger 24 for controlling the flow of heat transfer medium to and from the ducts 4 and 6.

The illustrated reactor comprises a reactor jacket 2, surrounded by two annular ducts 4 and 6. The annular ducts 4 and 6 communicate with the interior of the reactor jacket 2 in the region of the reaction tube bundle 30 in a central area 32 via a plurality of openings 8 distributed over the circumference of an inner wall 34, through which the heat transfer medium passes in and out of the interior of the reactor jacket, as indicated by arrows in FIGS. 2 and 3.

Figure 1:
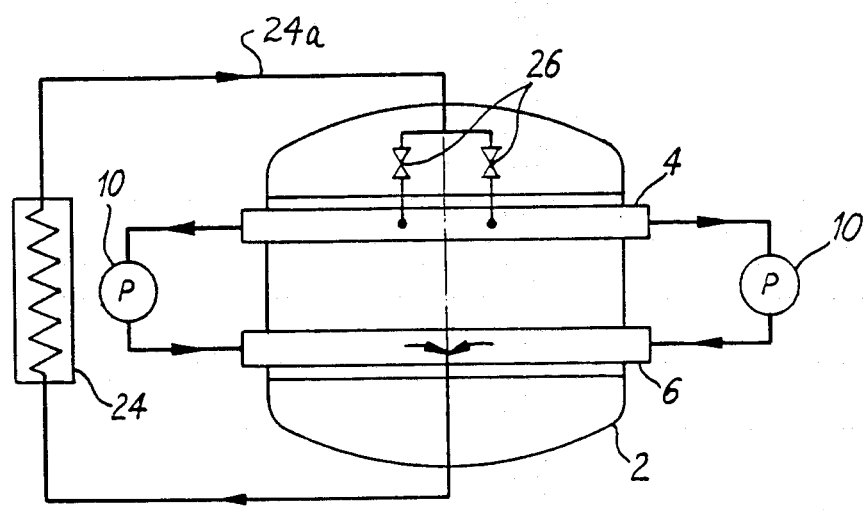
FIG. 1 is a schematic side elevational view of a reactor constructed in accordance with the invention.

At two diagonally opposite points, two circulating pumps 10 for the heat transfer medium are connected to the annular ducts 4 and 6 in the manner visible from FIG. 1. The respective arrows indicate the flow direction of the heat jacket 2, whereby an additional mixing results. At equal distances from the junctions 12 the annular ducts 4 and 6 are separated from each other by radially extending dividing walls 14 (FIGS. 2 and 3) into semi-annular sections 16 and 18 and 20 and 22. In this manner each pump 10 communicates with two fourths of each annular duct. One end of each of the duct sections 16, 18, 20 and 22 thus formed is connected at a junction 23 with a heat exchanger 24, which is either a cooler or a heater depending on the type of heat tone occurring, heat is either drawn from or supplied to the heat transfer medium in a shunt line to the main circulation. The setting elements 26 permit control of the heat removed or supplied separately for both sides of the reactor and also according to the instantaneous requirements, which on start-up are as a rule different than during operation of the reactor. Appropriately the setting elements 26 will be a component part of a control circuit.

The described connection of the heat exchanger 24 permits using the latter at always constant entrance and exit temperatures, while the mean temperature of the circulation is controllable during continuous operation of the pumps 10 by the respective quantity branched off into the heat exchanger.

While a specific embodiment of the invention has been shown and described in detail to illustrate the application of the principles of the invention, it will be understood that the invention may be embodied otherwise without departing from such principles.

What is claimed is:

1. A reactor carrying out exothermic and endothermic catalytic reactions, comprising a reactor housing an axial direction, a contact tube bundle in the reactor housing, at least one pair of axially spaced annular ducts extending around said housing at two axially spaced locations, said housing having a plurality of circumferentially spaced radially extending admission and discharge passages adjacent each of said pair of annular ducts for communicating an interior of each duct with an interior of said reactor housing, said admission and discharge passages provided for the passage of a heat transfer medium to and from said tube bundle, each annular duct having at least one exchanger junction, and external heat exchanger which is external of said reactor housing, connected between said heat exchanger junction of one annular duct and said heat exchanger junction of the other annular duct in said pair of annular ducts, each annular duct having a plurality of pump junctions circumferentially distributed around, and a plurality of pumps each effective in a common axial direction, each pump having an inlet connected to one of said plurality of pump junctions of one of said at least one pair of annular ducts and an outlet connected to one of said plurality pump junctions of the other of said at least one pair of annular ducts so that all of said plurality of pumps are effective to pump heat transfer medium from each of said ducts of said at least one pair of annular ducts in said common axial direction.

2. A reactor according to claim 1 said heat exchanger having a junction conduit for each annular duct section and including control means connected to each of said heat exchanger junction conduits for individually controlling a flow of heat exchange medium to different portions of at least one of said annular ducts.

3. A reactor according to claim 2 including a plurality of dividing walls extending along at least one of said annular ducts for dividing one annular duct into a plurality of annular duct sections corresponding in number to the number of said plurality of pumps, each dividing wall being positioned between two pump junctions.

4. A reactor according to claim 3 wherein each dividing wall is spaced equally between two pump junctions to form a plurality of equal annular duct sections.

5. A reactor according to claim 4 wherein each pump with its inlet and outlet and said pump junctions connected thereto, are axially alligned.

6. A reactor according to claim 5, wherein said heat exchanger comprises a single heat exchanger connected to each of said ducts, said heat exchanger junctions for the connection of said heat exchanger lying between the location of said pumps.

7. A reactor according to claim 6, wherein said heat exchanger junctions are located in respect to said annular ducts at equal spacing from the location of said pumps.

8. A reactor according to claim 5, wherein said pumps are connected so that partial quantities of heat transfer medium transported thereby combine in a common flow in the interior of said reactor housing in said annular ducts.

9. A reactor according to claim 6 wherein said control means comprises a heat exchanger junction for each annular duct section, each heat exchanger junction connected to said heat exchanger and a setting control in each heat exchanger junction between said one annular duct and said heat exchanger for controlling flow of heat transfer medium to and from said heat exchanger.

10. A reactor according to claim 1 wherein each annular duct has two diametrically opposed pump junctions, each having a pump with its inlet, outlet and connected pump junctions being axially alligned, each annular duct having an inner circumferencial wall through which said admission and discharge passages pass.

11. A reactor according to claim 10 including two diametrically opposed dividing walls in each of said annular ducts dividing each duct into two semi-annular sections on opposite sides of said dividing walls, each pump junction being equally spaced from said two dividing walls, each semi-annular section of each annular duct having one heat exchanger junction, said heat exchanger junction for each of said annular ducts being adjacent and on opposite sides of one of said dividing walls and said heat exchanger junctions of each duct being connected to said heat exchanger.

12. A reactor according to claim 11 including control means connected into said heat exchanger junctions of one of said ducts for selectively controlling a flow of heat transfer medium in each heat exchanger junction.

13. A reactor according to claim 12 wherein said control means comprises a separate setting element in each heat exchanger junction of one of said annular ducts.

14. A reactor according to claim 13 wherein said housing is cylindrical.

* * * * *